United States Patent
Campbell et al.

(10) Patent No.: US 9,714,702 B2
(45) Date of Patent: Jul. 25, 2017

(54) VARIABLE COAXIAL SHAFT FOR HYDRAULIC UNIT

(71) Applicant: Hamilton Sundstrand Corporation, Charlotte, NC (US)

(72) Inventors: Kris H. Campbell, Poplar Grove, IL (US); Glenn C. Lemmers, Jr., Loves Park, IL (US); Mark J. Franklin, Janesville, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 264 days.

(21) Appl. No.: 14/663,664

(22) Filed: Mar. 20, 2015

(65) Prior Publication Data

US 2016/0273645 A1 Sep. 22, 2016

(51) Int. Cl.
*F16H 57/04* (2010.01)
*F16H 48/06* (2006.01)
*F16H 48/42* (2012.01)
*F16C 3/02* (2006.01)
*F16H 47/04* (2006.01)
*F16H 48/38* (2012.01)

(52) U.S. Cl.
CPC .............. *F16H 57/043* (2013.01); *F16C 3/02* (2013.01); *F16H 47/04* (2013.01); *F16H 48/06* (2013.01); *F16H 48/42* (2013.01); *F16H 57/0484* (2013.01); *F16H 2048/382* (2013.01)

(58) Field of Classification Search
None
See application file for complete search history.

(56) References Cited

U.S. PATENT DOCUMENTS

| 4,793,200 | A | * | 12/1988 | McDonald | F16H 57/0006 74/331 |
|---|---|---|---|---|---|
| 2007/0084517 | A1 | * | 4/2007 | Maguire | F16H 57/043 138/115 |
| 2012/0246867 | A1 | * | 10/2012 | Ziegler | F16D 1/06 16/2.1 |
| 2013/0283972 | A1 | * | 10/2013 | Yamamoto | B60K 6/405 74/665 B |
| 2015/0337945 | A1 | * | 11/2015 | McKinzie | F16D 1/06 403/34 |

FOREIGN PATENT DOCUMENTS

EP   2657574   10/2013

OTHER PUBLICATIONS

EP Application No. 16161333.6 Extended European Search Report, Issued Aug. 10, 2016, 8 pages.

* cited by examiner

*Primary Examiner* — Justin Holmes
(74) *Attorney, Agent, or Firm* — Cantor Colburn LLP

(57) ABSTRACT

A variable coaxial shaft for a hydraulic unit includes a shaft body having a variable input shaft interface to drive rotation of a variable input shaft of the hydraulic unit. The variable coaxial shaft also includes a differential assembly interface having a first sealing interface, a second sealing interface, and one or more lubrication ports between the first sealing interface and the second sealing interface. The differential assembly interface is configured to be driven by a differential assembly. The one or more lubrication ports provide a lubrication path to the differential assembly. A shaft length is defined between a first end of the variable input shaft interface and a second end of the differential assembly interface. A ratio of the shaft length to a shaft diameter of the shaft body is between 18.65 and 19.12.

12 Claims, 6 Drawing Sheets

VARIABLE COAXIAL SHAFT FOR HYDRAULIC UNIT

BACKGROUND OF THE INVENTION

Embodiments of this invention generally relate to an integrated drive generator, and more particularly, to a variable coaxial shaft for a hydraulic unit of an integrated drive generator.

Aircraft currently rely on electrical, pneumatic, and hydraulic systems for secondary power. A typical electrical system utilizes an integrated drive generator coupled to each engine of an aircraft to provide fixed frequency power to a power distribution system and associated loads. One type of integrated drive generator includes a generator, a hydraulic unit, and a differential assembly arranged in a common housing. The differential assembly is operably coupled to an aircraft engine, such as a gas turbine engine, via an input shaft. The rotational speed of the input shaft varies during operation of the engine. The hydraulic unit cooperates with the differential assembly to provide a constant speed to the generator throughout engine operation.

Due to engineering designs and requirements, various components of the systems must be designed to operatively function together. For example, various components of the hydraulic unit are configured to appropriately and accurately mate and fit together to enable efficient operation. Constraints such as power, envelope, weight, leakage, operational stresses, environmental stresses, pressure limits, speed limits, material constraints, loads, and the like present a number of design challenges.

BRIEF DESCRIPTION OF THE INVENTION

According to one embodiment of the invention, a variable coaxial shaft for a hydraulic unit includes a shaft body having a variable input shaft interface to drive rotation of a variable input shaft of the hydraulic unit. The variable coaxial shaft also includes a differential assembly interface having a first sealing interface, a second sealing interface, and one or more lubrication ports between the first sealing interface and the second sealing interface. The differential assembly interface is configured to be driven by a differential assembly. The one or more lubrication ports provide a lubrication path to the differential assembly. A shaft length is defined between a first end of the variable input shaft interface and a second end of the differential assembly interface. A ratio of the shaft length to a shaft diameter of the shaft body is between 18.65 and 19.12.

A method of installing a variable coaxial shaft in an integrated drive generator includes coupling a variable input shaft interface of a shaft body of the variable coaxial shaft with a variable input shaft of a hydraulic unit of the integrated drive generator. A differential assembly interface of the variable coaxial shaft is coaxially inserted within a differential assembly of the integrated drive generator. One or more lubrication ports of the differential assembly interface are aligned to provide a lubrication path to the differential assembly. The differential assembly interface includes a first sealing interface and a second sealing interface. The one or more lubrication ports are formed between the first sealing interface and the second sealing interface. A shaft length is defined between a first end of the variable input shaft interface and a second end of the differential assembly interface. A ratio of the shaft length to a shaft diameter of the shaft body is between 18.65 and 19.12.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example, with reference to the drawings.

DETAILED DESCRIPTION OF THE INVENTION

Figure 1:
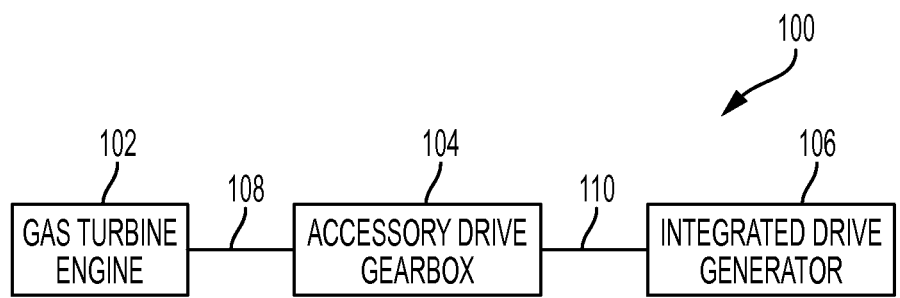
FIG. 1 is a schematic diagram of an exemplary power generator system of an aircraft.

Referring now to FIG. 1, an example of a generator system 100 is schematically illustrated. The generator system 100 includes a gas turbine engine 102 that is configured to rotationally drive an integrated drive generator 106 through an accessory drive gearbox 104 mounted on the gas turbine engine 102. The accessory drive gearbox 104 is coupled to a spool 108 of the gas turbine engine 102, and the speed of the spool 108 varies throughout the entire operation of the gas turbine engine 102, depending on operational characteristics, such as high altitude cruising flight or take-off of an aircraft in which the generator system 100 is installed. An input shaft 110 is configured to transfer rotational energy to the integrated drive generator 106 from the accessory drive gearbox 104. Those skilled in the art will appreciated that the generator system 100 of FIG. 1 directed to an aircraft is merely presented for illustrative and explanatory purposes and other generator systems and/or engines may be used without departing from the scope of the invention.

Figure 2:
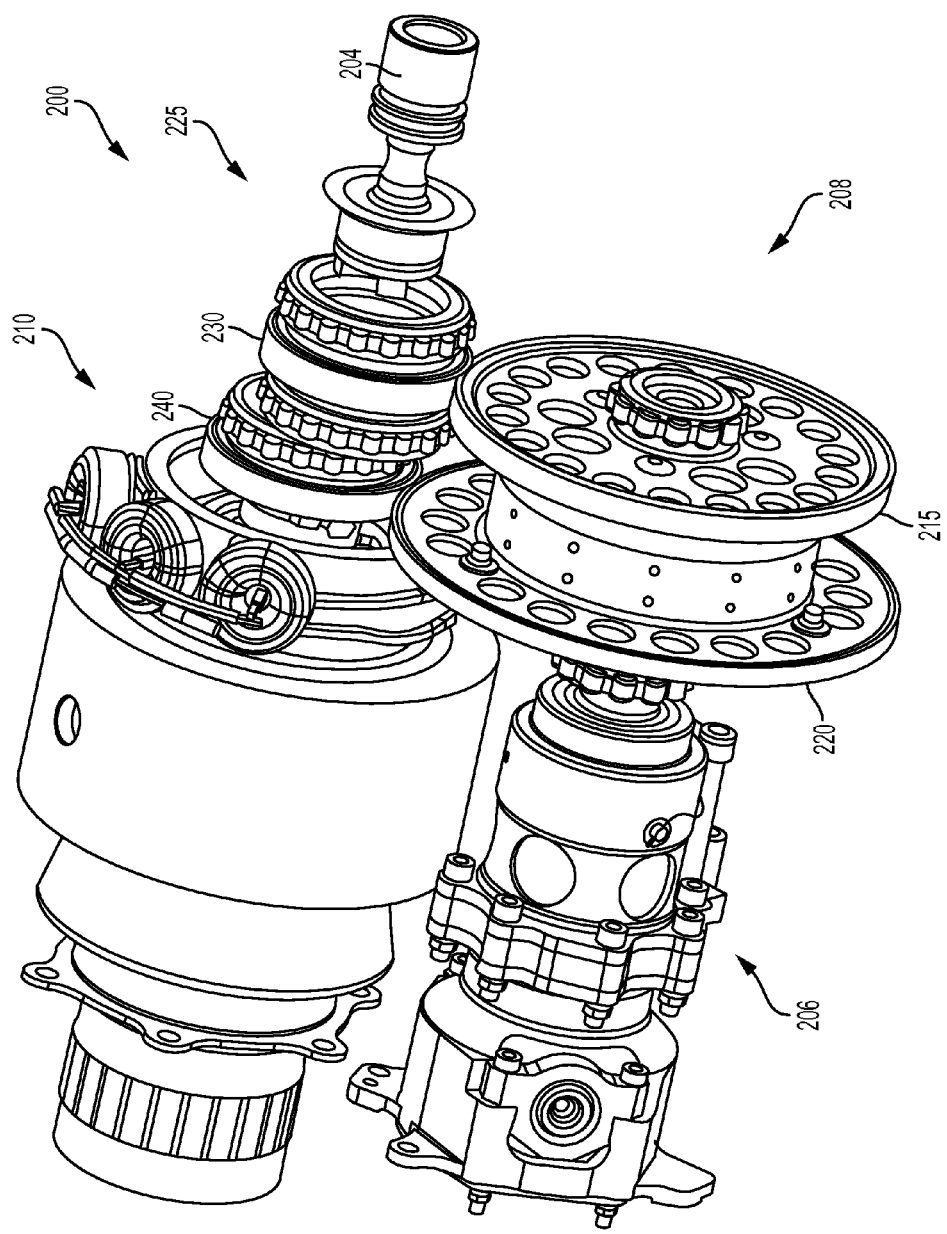
FIG. 2 is a perspective view of an example of an integrated drive generator.

An example of an integrated drive generator 200 is shown in FIG. 2 as an embodiment of the integrated drive generator 106 of FIG. 1. In the illustrated embodiment, the integrated drive generator 200 includes an input shaft 204 configured to receive rotational drive from an accessory drive gearbox (see FIG. 1). The rotational speed of the input shaft 204 varies depending upon the operation of the engine (see FIG. 1). To this end, a hydraulic unit 206 cooperates with a differential assembly 208 to convert the variable rotational speed from the input shaft 204 to a fixed rotational output speed that is transferred to a generator 210. The differential assembly 208 includes an input driven gear 215 and an output driven gear 220. The differential assembly 208 is in-line with a hydraulic unit 206. The input driven gear 215 of the differential assembly 208 is operatively coupled to an input system 225 via output drive gear 230. The output driven gear 220 of the differential assembly 208 is operatively coupled to the generator 210 via a driven gear 240. Based on this operative coupling, the differential assembly 208 converts a variable speed input from the input system 225 supplied by a variable speed drive source into a constant speed output employed to drive generator 210.

Figure 3:
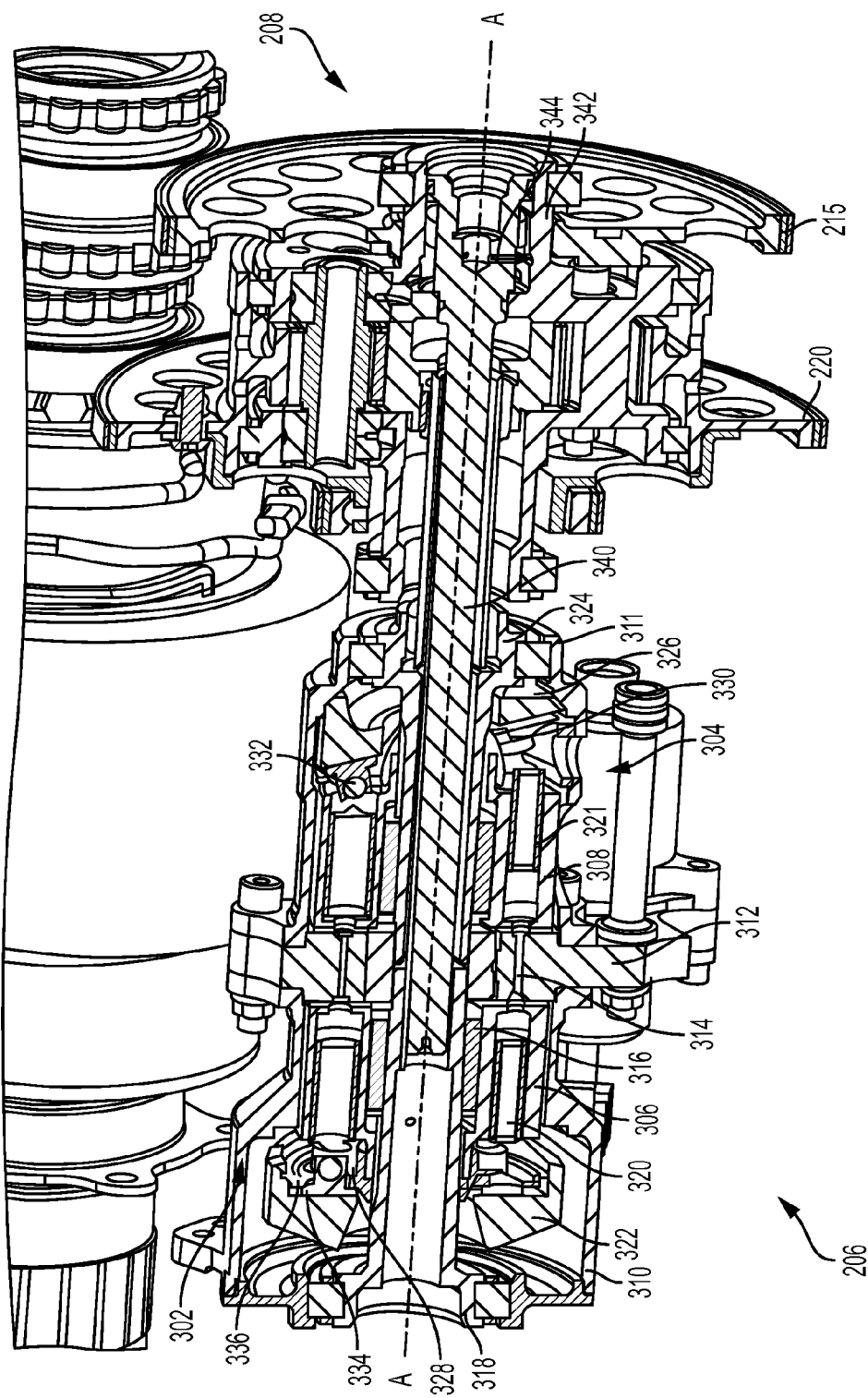
FIG. 3 is a cross-sectional schematic view of an example of a hydraulic unit and a differential assembly of the integrated drive generator of FIG. 2.

Referring now to FIG. 3, a cross-sectional view of the hydraulic unit 206 and differential assembly 208 of the integrated drive generator 200 of FIG. 2 is shown. The hydraulic unit 206 includes a variable displacement hydraulic pump 302 and a fixed displacement hydraulic motor 304. The variable displacement hydraulic pump 302 and the fixed displacement hydraulic motor 304 have respective cylinder block assemblies 306 and 308 which are arranged for rotation about a common axis A within housings 310, 311 on opposite sides of a stationary port plate 312 of the hydraulic unit 206. The port plate 312 is formed with one or more kidneys or apertures 314 through which hydraulic fluid communication between the pump 302 and the motor 304 is established during normal operation of the hydraulic unit 206. A biasing mechanism 316 resiliently biases the cylinder block assemblies 306, 308 in the direction of the port plate 312.

The operation of the hydraulic unit 206 in an integrated drive generator, for example an integrated drive generator of an aircraft, involves transmission of torque from an engine of the aircraft to an input, which rotates an input shaft 318 of the hydraulic unit 206 about axis A. The cylinder block assembly 306 of the pump 302 is connected to the input shaft 318 for rotation therewith. Pistons 320 within the cylinder block assembly 306 of the pump 302 are displaced during rotation an amount which is a function of the setting of a variable swashplate or wobbler 322 of the pump 302. Pistons 321 within the cylinder block assembly 308 of the motor 304 are displaced during rotation with respect to a fixed swash plate or wobbler 326 of the motor 304. Those of skill in the art will appreciate that any number of pistons and associated apertures may be employed without departing from the scope of the invention. For example, in one embodiment, the system may include nine pistons 320, 321 in each of the motor 304 and the pump 302, and nine apertures 314 may pass through the port plate 312. Further, for example, the number of apertures 314 is not dependent on the number of pistons 320, 321, and in some embodiments there may be five apertures 314 when nine pistons 320, 321 are employed. Thus, the number of pistons 320, 321 and the number apertures 314 may be varied without departing from the scope of the invention.

Hydraulic fluid under pressure from the hydraulic pump 302 is delivered to the hydraulic motor 304 through the apertures 314 of port plate 312 for rotating the cylinder block assembly 308 and an output shaft 324 to which the cylinder block assembly 308 is fixedly connected. The swashplate or wobbler 326 of the motor 304 is fixedly configured so that an operating speed of the motor 304 is a function of a displacement of the pump 302. The rotary output from output shaft 324 is added to or subtracted from the rotary motion from the engine through a conventional differential gearing of an integrated drive generator for operating an electrical generator at a substantially constant rotational speed. That is, since the speed of the rotation from the aircraft engine to the input shaft 318 of the hydraulic unit 206 will vary, the position of the variable wobbler 322 is adjusted in response to these detected speed variations for providing the necessary reduction or increase in the rotational speed for obtaining a desired constant output speed to the generator. During normal operation, there is a hydrostatic balance of the cylinder block assemblies 306, 308 and port plate 312. Although the hydraulic unit 206 illustrated and described herein refers to the variable unit as a pump 302 and the fixed unit as a motor 304, hydraulic units having other configurations, such as where the variable unit functions as a motor and the hydraulic unit operates as a pump for example, are within the scope of the invention.

During operation, the wobbler 322 is permitted to turn, rotate, tumble, and/or wobble about a retainer ball 328. The wobbler 322 is configured to wobble, etc., in part, as a result of the movement of the pistons 320, 321, respectively. A retainer ball 330 is configured to turn or rotate with respect to the wobbler 326. Each piston 320, 321 has a ball 332 (ball of piston 320 not labeled for clarity) on one end. The ball 332 of the pistons 320, 321 is retained within a slipper 334. The slipper 334 is retained by a slipper retainer 336. The slipper retainer 336 enables the slipper 334 to be held in contact with the wobbler 322, 326, thus enabling operational coupling and/or contact between the wobblers 322, 326 and the pistons 320, 321, respectively, of the pump 302 and the motor 304.

A variable coaxial shaft 340 is coaxially aligned along central axis A, passing through an interior of the output shaft 324 and interfaces with the input shaft 318. The variable coaxial shaft 340 also interfaces with a gear support 342 of the input driven gear 215 of the differential assembly 208. Rotational motion of the input driven gear 215 is translated through the variable coaxial shaft 340 to the input shaft 318. The resulting hydraulic pumping action drives the output shaft 324 to rotate at a substantially fixed speed, which in turn rotates the output driven gear 220 of the differential assembly 208 at a substantially fixed speed using epicyclic gearing. Rotation of the variable coaxial shaft 340 also urges hydraulic fluid in a lubrication path 344 to lubricate the differential assembly 208.

Figure 4:
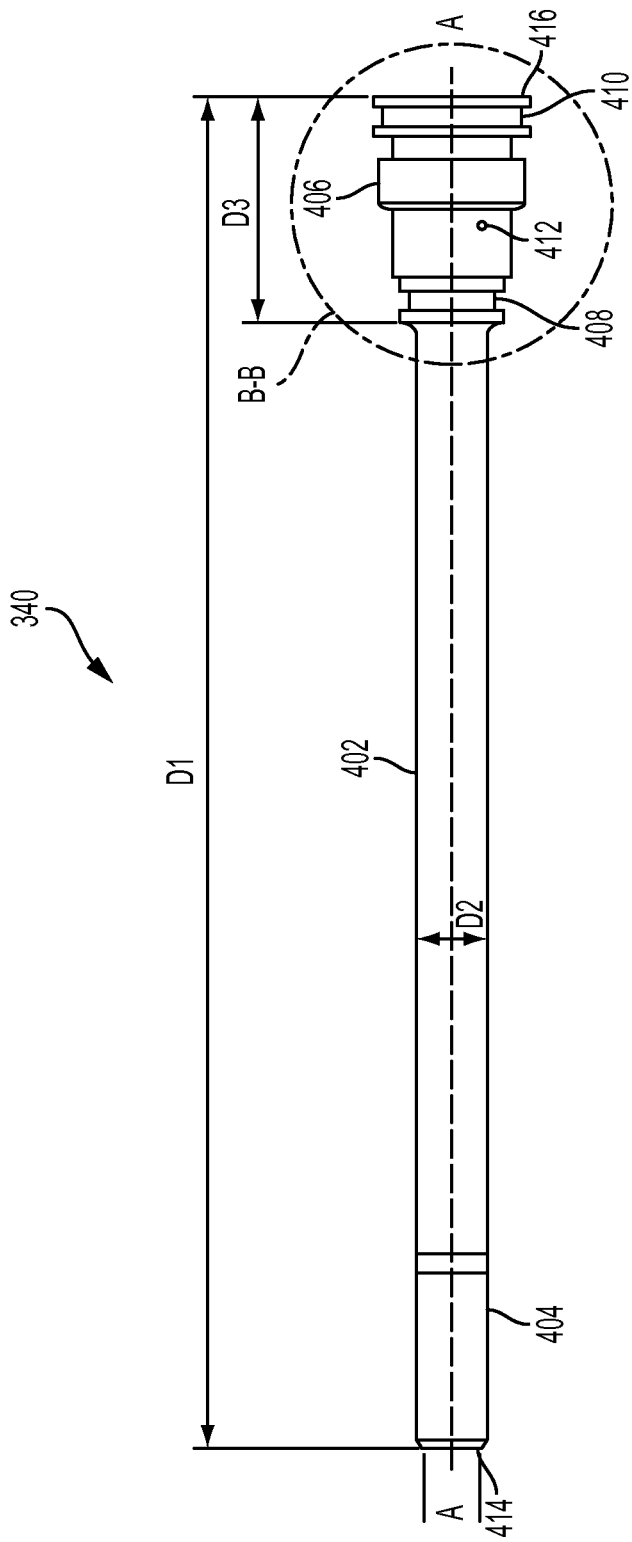
FIG. 4 is a plan view of a variable coaxial shaft that links the hydraulic unit and differential assembly of FIG. 3 in accordance with an embodiment of the invention.

Turning now to FIG. 4, a plan view of the variable coaxial shaft 340 that links the hydraulic unit 206 and differential assembly 208 of FIG. 3 is depicted in accordance with an embodiment. In the example of FIG. 4, the variable coaxial shaft 340 includes a shaft body 402 having a variable input shaft interface 404 to drive rotation of a variable input shaft (e.g., input shaft 318 of FIG. 3) of the hydraulic unit 206 of FIG. 3. The variable coaxial shaft 340 also includes a differential assembly interface 406 having a first sealing interface 408, a second sealing interface 410, and one or more lubrication ports 412 between the first sealing interface 408 and the second sealing interface 410. In one embodiment, the differential assembly interface 406 includes three lubrication ports 412 equally distributed about 120 degrees apart. The differential assembly interface 406 is configured to be driven by the differential assembly 208 of FIG. 3, where the one or more lubrication ports 412 provide the lubrication path 344 of FIG. 3 to the differential assembly 208.

In an embodiment, a shaft length D1 is defined between a first end 414 of the variable input shaft interface 404 and a second end 416 of the differential assembly interface 406, and the shaft length D1 is about 8.025 inches (20.384 cm). The shaft body 402 has a shaft diameter D2 of about 0.425 inches (1.080 cm). The second sealing interface 410 is proximate the second end 416. A differential assembly interface length D3 is defined between the first sealing interface 408 and the second end 416. Further detail of area B-B of the differential assembly interface 406 is depicted in FIG. 5.

Figure 5:
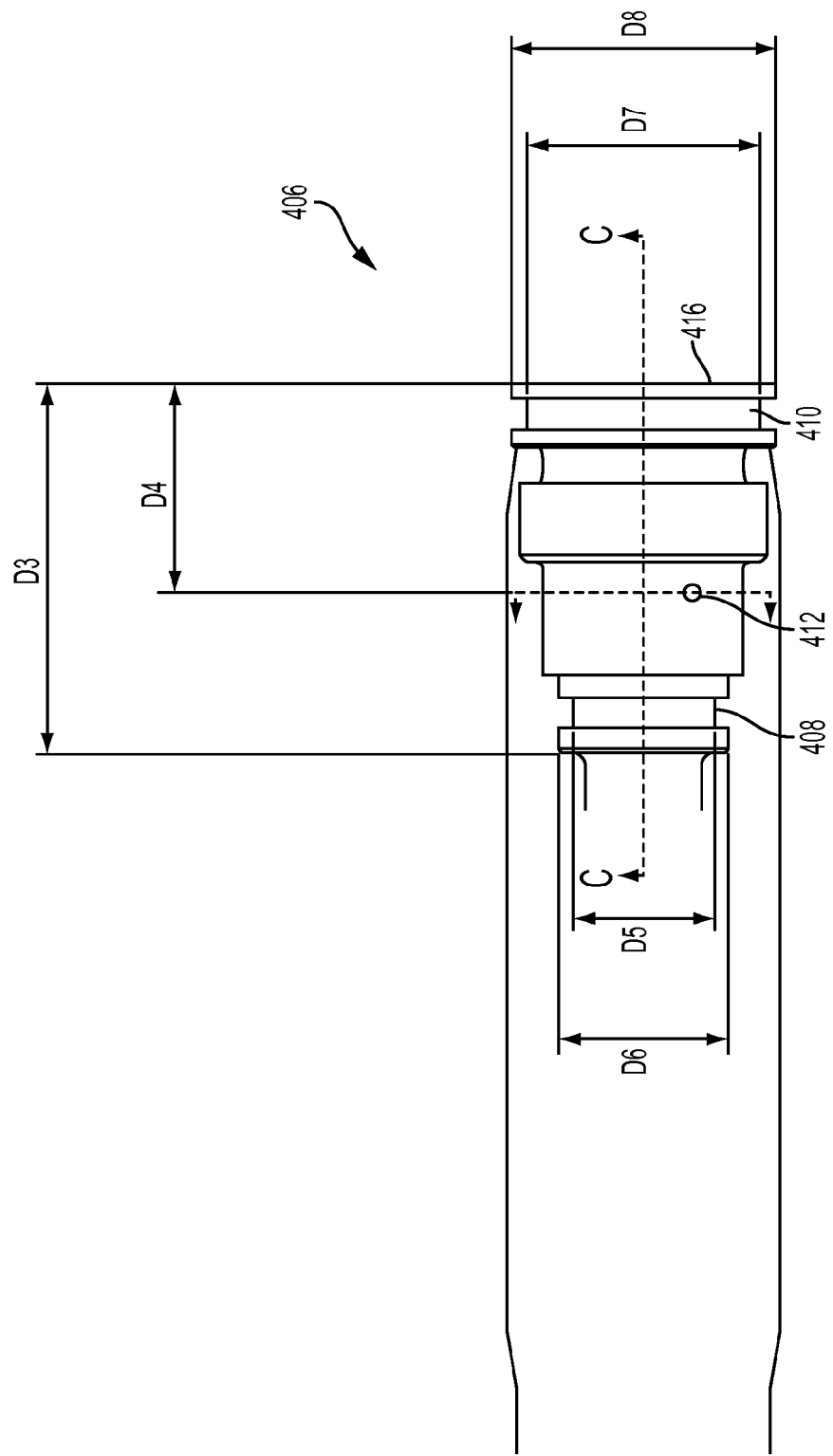
FIG. 5 is a plan view of a differential assembly interface of the variable coaxial shaft of FIG. 4.

As can be seen in FIG. 5, the one or more lubrication ports 412 are defined at a lubrication port offset D4 with respect to the second end 416. In an embodiment, the differential assembly interface length D3 is about 1.35 inches (3.429 cm), and the lubrication port offset D4 is about 0.765 inches (1.943 cm). The first sealing interface 408 has a first inner sealing diameter D5 and a first outer sealing diameter D6. The first inner sealing diameter D5 is about 0.513 inches (1.303 cm), and the first outer sealing diameter D6 is about 0.618 inches (1.570 cm). The second sealing interface 410 has a second inner sealing diameter D7 and a second outer sealing diameter D8. The second inner sealing diameter D7 is about 0.849 inches (2.156 cm), and the second outer sealing diameter D8 is about 0.963 inches (2.446 cm).

Figure 6:
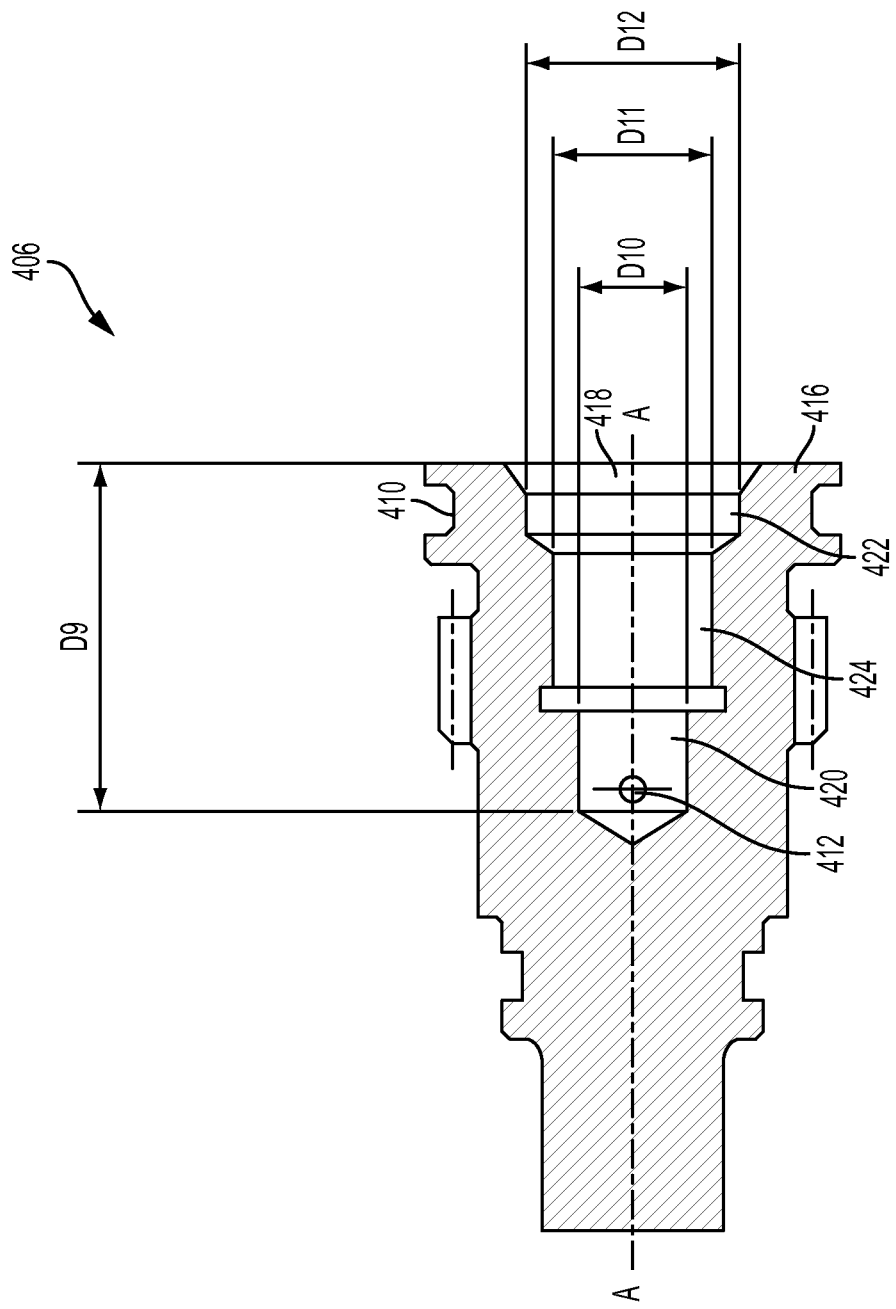
FIG. 6 is a cross-sectional schematic view of the differential assembly interface of the variable coaxial shaft of FIG. 4.

FIG. 6 is a cross-sectional schematic view of the differential assembly interface 406 of the variable coaxial shaft 340 taken at section C-C of FIG. 5. The differential assembly interface 406 further includes an inner bore 418 as part of the lubrication path 344 of FIG. 3. The inner bore 418 has a bore depth D9 defined with respect to the second end 416. The inner bore 418 includes a first inner bore portion 420 proximate the one or more lubrication ports 412, a second inner bore portion 422 proximate the second end 416, and an intermediate inner bore portion 424 between the first inner bore portion 420 and the second inner bore portion 422. In an embodiment, the bore depth D9 is about 0.82 inches (2.083 cm), a diameter D10 of the first inner bore portion 420 is about 0.25 inches (0.635 cm), a diameter D11 of the intermediate inner bore portion 424 is about 0.375 inches (0.953 cm), and a diameter D12 of the second inner bore portion 422 is about 0.5 inches (1.27 cm).

A number of ratios are defined between multiple features of the variable coaxial shaft 340 of FIGS. 3-6. In an embodiment, a ratio of the shaft length D1 to a shaft diameter D2 of the shaft body 402 is between 18.65 and 19.12. A ratio of the shaft length D1 to the differential assembly interface length D3 is between 5.89 and 6.0. A ratio of the differential assembly interface length D3 to the lubrication port offset D4 is between 1.72 and 1.81. A ratio of the differential assembly interface length D3 to the bore depth D9 is between 1.61 and 1.68. A ratio of the shaft diameter D2 to the diameter D10 of the first inner bore portion 420 is between 1.61 and 1.80. A ratio of the diameter D12 of the second inner bore portion 422 to the diameter D10 of the first inner bore portion 420 is between 1.88 and 2.13, and a ratio of a diameter D11 of the intermediate inner bore portion 424 to the diameter D10 of the first inner bore portion is between 1.40 and 1.61. A ratio of the second outer sealing diameter D8 to the first outer sealing diameter D6 is between 1.55 and 1.57. A ratio of the second inner sealing diameter D7 to the first inner sealing diameter D5 is between 1.64 and 1.67. A ratio of the second outer sealing diameter D8 to the shaft diameter D2 is between 2.23 and 2.30. A ratio of the first outer sealing diameter D6 to the shaft diameter D2 is between 1.43 and 1.48.

A method of installing the variable coaxial shaft 340 in the integrated drive generator 200 of FIG. 2 includes coupling a variable input shaft interface 404 of shaft body 402 of the variable coaxial shaft 340 with a variable input shaft, such as input shaft 318 of the hydraulic unit 206 of the integrated drive generator 200. A differential assembly interface 406 of the variable coaxial shaft 340 is inserted coaxially within differential assembly 208 of the integrated drive generator 200. One or more lubrication ports 412 of the differential assembly interface 406 are aligned to provide lubrication path 344 to the differential assembly 208. As previously described, the differential assembly interface 406 includes a first sealing interface 408 and a second sealing interface 410, where the one or more lubrication ports 412 are formed between the first sealing interface 408 and the second sealing interface 410.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments.

Accordingly, the invention is not to be seen as limited by the foregoing description, but is only limited by the scope of the appended claims.

What is claimed is:

1. A variable coaxial shaft for a hydraulic unit, the variable coaxial shaft comprising:
    a shaft body having a variable input shaft interface to drive rotation of a variable input shaft of the hydraulic unit; and
    a differential assembly interface having a first sealing interface, a second sealing interface, and one or more lubrication ports between the first sealing interface and the second sealing interface, the differential assembly interface configured to be driven by a differential assembly, and the one or more lubrication ports providing a lubrication path to the differential assembly, wherein a shaft length is defined between a first end of the variable input shaft interface and a second end of the differential assembly interface, and a ratio of the shaft length to a shaft diameter of the shaft body is between 18.65 and 19.12, wherein the second sealing interface is proximate the second end, a differential assembly interface length is defined between the first sealing interface and the second end, a ratio of the shaft length to the differential assembly interface length is between 5.89 and 6.0, the one or more lubrication ports are defined at a lubrication port offset with respect to the second end, and a ratio of the differential assembly interface length to the lubrication port offset is between 1.72 and 1.81.

2. The variable coaxial shaft of claim 1, wherein the differential assembly interface further comprises an inner bore as part of the lubrication path, the inner bore having a bore depth defined with respect to the second end, and a ratio of the differential assembly interface length to the bore depth is between 1.61 and 1.68.

3. The variable coaxial shaft of claim 2, wherein the inner bore comprises a first inner bore portion proximate the one or more lubrication ports, a second inner bore portion proximate the second end, and an intermediate inner bore portion between the first inner bore portion and the second inner bore portion, and a ratio of the shaft diameter to a diameter of the first inner bore portion is between 1.61 and 1.80.

4. The variable coaxial shaft of claim 3, wherein a ratio of a diameter of the second inner bore portion to the diameter of the first inner bore portion is between 1.88 and 2.13, and a ratio of a diameter of the intermediate inner bore portion to the diameter of the first inner bore portion is between 1.40 and 1.61.

5. The variable coaxial shaft of claim 1, wherein the first sealing interface has a first inner sealing diameter and a first outer sealing diameter, the second sealing interface has a second inner sealing diameter and a second outer sealing diameter, a ratio of the second outer sealing diameter to the first outer sealing diameter is between 1.55 and 1.57.

6. The variable coaxial shaft of claim 5, wherein a ratio of the second inner sealing diameter to the first inner sealing diameter is between 1.64 and 1.67.

7. The variable coaxial shaft of claim 5, wherein a ratio of the second outer sealing diameter to the shaft diameter is between 2.23 and 2.30.

8. The variable coaxial shaft of claim 5, wherein a ratio of the first outer sealing diameter to the shaft diameter is between 1.43 and 1.48.

9. A method of installing a variable coaxial shaft in an integrated drive generator, the method comprising:
coupling a variable input shaft interface of a shaft body of the variable coaxial shaft with a variable input shaft of a hydraulic unit of the integrated drive generator;
inserting a differential assembly interface of the variable coaxial shaft coaxially within a differential assembly of the integrated drive generator; and
aligning one or more lubrication ports of the differential assembly interface to provide a lubrication path to the differential assembly, wherein the differential assembly interface comprises a first sealing interface and a second sealing interface, the one or more lubrication ports formed between the first sealing interface and the second sealing interface, a shaft length is defined between a first end of the variable input shaft interface and a second end of the differential assembly interface, and a ratio of the shaft length to a shaft diameter of the shaft body is between 18.65 and 19.12, wherein the second sealing interface is proximate the second end, a differential assembly interface length is defined between the first sealing interface and the second end, the one or more lubrication ports are defined at a lubrication port offset with respect to the second end, a ratio of the shaft length to the differential assembly interface length is between 5.89 and 6.0, and a ratio of the differential assembly interface length to the lubrication port offset is between 1.72 and 1.81.

10. The method of claim 9, wherein the differential assembly interface further comprises an inner bore as part of the lubrication path, the inner bore having a bore depth defined with respect to the second end, the inner bore comprises a first inner bore portion proximate the one or more lubrication ports, a second inner bore portion proximate the second end, and an intermediate inner bore portion between the first inner bore portion and the second inner bore portion, a ratio of the differential assembly interface length to the bore depth is between 1.61 and 1.68, a ratio of the shaft diameter to a diameter of the first inner bore portion is between 1.61 and 1.80, a ratio of a diameter of the second inner bore portion to the diameter of the first inner bore portion is between 1.88 and 2.13, and a ratio of a diameter of the intermediate inner bore portion to the diameter of the first inner bore portion is between 1.40 and 1.61.

11. The method of claim 9, wherein the first sealing interface has a first inner sealing diameter and a first outer sealing diameter, the second sealing interface has a second inner sealing diameter and a second outer sealing diameter, a ratio of the second outer sealing diameter to the first outer sealing diameter is between 1.55 and 1.57.

12. The method of claim 11, wherein a ratio of the second inner sealing diameter to the first inner sealing diameter is between 1.64 and 1.67, a ratio of the second outer sealing diameter to the shaft diameter is between 2.23 and 2.30, and a ratio of the first outer sealing diameter to the shaft diameter is between 1.43 and 1.48.

* * * * *